United States Patent
English et al.

(10) Patent No.: US 6,987,256 B2
(45) Date of Patent: Jan. 17, 2006

(54) POLARIZED SEMI-ACTIVE LASER LAST PULSE LOGIC SEEKER USING A STARING FOCAL PLANE ARRAY

(75) Inventors: James E. English, Madison, AL (US); William C. Pittman, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 80 days.

(21) Appl. No.: 10/853,748

(22) Filed: May 24, 2004

(65) Prior Publication Data

US 2005/0258348 A1 Nov. 24, 2005

(51) Int. Cl.
*G01C 21/24* (2006.01)
*G01C 21/00* (2006.01)
*G02F 1/01* (2006.01)

(52) U.S. Cl. ............... 250/203.6; 250/206.1; 250/225; 356/5.14; 359/489; 359/501

(58) Field of Classification Search .......... None
See application file for complete search history.

(56) References Cited

U.S. PATENT DOCUMENTS

| | | | |
|---|---|---|---|
| 4,952,809 A | 8/1990 | McEwen | 250/342 |
| 5,453,871 A | 9/1995 | Kolner et al. | 359/238 |
| 5,835,199 A * | 11/1998 | Phillips et al. | 356/5.03 |
| 5,944,281 A * | 8/1999 | Pittman et al. | 244/3.12 |
| 6,111,241 A | 8/2000 | English et al. | 250/203.2 |
| 6,122,404 A | 9/2000 | Barter et al. | 382/260 |
| 6,310,345 B1 | 10/2001 | Pittman et al. | 250/334 |
| 6,359,681 B1 * | 3/2002 | Housand et al. | 356/4.01 |
| 6,836,320 B2 * | 12/2004 | Deflumere et al. | 356/141.1 |

\* cited by examiner

*Primary Examiner*—David Porta
*Assistant Examiner*—Davienne Monbleau
(74) *Attorney, Agent, or Firm*—Hay Kyung Chang

(57) ABSTRACT

An improvement in a semi-active laser last pulse logic missile seeker is disclosed and claimed. In one embodiment, the improvement includes a first polarizer disposed in the detection field of view of the PIN photodiode detector and a second polarizer disposed in the detection field of view of the staring imaging infrared focal plane array. Each of the first and second polarizers has an identically configured plurality of segments. Each segment allows transmission of a different polarization than other segments and is sized to completely cover the fields of view of both the PIN photodiode detector and the staring imaging infrared focal plane array. First and second actuators are connected to the first and second polarizers, respectively, to synchronously and simultaneously step identical and corresponding segments in a plurality of discrete steps within the fields of view in response to incoming temporal and spatial laser returns.

22 Claims, 3 Drawing Sheets

POLARIZED SEMI-ACTIVE LASER LAST PULSE LOGIC SEEKER USING A STARING FOCAL PLANE ARRAY

DEDICATORY CLAUSE

The invention described herein may be manufactured, used and licensed by or for the Government for governmental purposes without the payment to us of any royalties thereon.

BACKGROUND

The invention relates to missiles generally, and more particularly, to a polarized semi-active laser last pulse logic missile seeker.

Conventional semi-active laser last pulse logic (SALLPL) missile seekers, staring imaging infrared ($I^2R$) focal plane arrays, and their use together to detect and track missile targets, are known in the art. For example, U.S. Pat. No. 6,111,241 ('241 patent), issued to English et al., sets forth and describes combining semi-active laser last pulse logic signal processing using a single PIN photodiode with a staring imaging infrared focal plane array to effectuate a more accurate and direct impact of a Hellfire missile on a laser-illuminated target.

A weakness in the system described in the '241 patent is that the temporal and spatial laser returns (e.g. laser energy reflected, or scattered, from the laser-illuminated target) are often difficult to distinguish from background and/or jamming radiation, commonly called "clutter", existing at or near the target location. Clutter interferes with the temporal and spatial laser returns and renders target acquisition and tracking difficult. However incorporating polarization as described and claimed herein will enhance the target discrimination capability of conventional SALLPL seekers.

As described in U.S. Pat. No. 6,310,345 ('345 patent) issued to Pittman et al., infrared polarimetry is a technique for acquiring and processing emissive and scattered radiation in the infrared bands. A relatively new and slowly maturing technology, infrared polarimetry is limited by polarization aberrations, scattering and birefringence effects introduced by extant instrumentation.

As described in the '345 patent, infrared polarimetry can be used to enhance the discrimination of targets from clutter, but use has been limited to conventional forward looking infrared (FLIR) camera systems, such as those produced by FLIR Systems of Boston, Mass. These conventional systems detect and convert infrared energy (heat) into an electronic signal, which is then processed to produce a thermal image which can be displayed on a video monitor.

Because conventional FLIR camera systems differ significantly from semi-active laser last pulse missile seekers in components, operation and application, it is desirable to adapt and apply infrared polarimetry technology to a SALLPL missile seeker, which utilizes a staring imaging infrared focal plane array, in a manner that enhances the SALLPL missile seeker's ability to acquire and track laser-illuminated targets and distinguish such targets from clutter.

SUMMARY OF THE INVENTION

An improvement in a semi-active laser last pulse logic missile seeker is disclosed and claimed. In one embodiment, the improvement includes a first polarizer disposed in the detection field of view of the PIN photodiode detector and a second polarizer disposed in the detection field of view of the staring imaging infrared focal plane array. Each of the first and second polarizers has an identically configured plurality of segments. Each segment allows transmission of a different polarization than other segments and is sized to completely cover the field of views of both the PIN photodiode detector and the staring imaging infrared focal plane array. First and second actuators are connected to the first and second polarizers, respectively, to synchronously and simultaneously step identical and corresponding segments in a plurality of discrete steps within the fields of view in response to incoming temporal and spatial laser returns.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION

Figure 1:
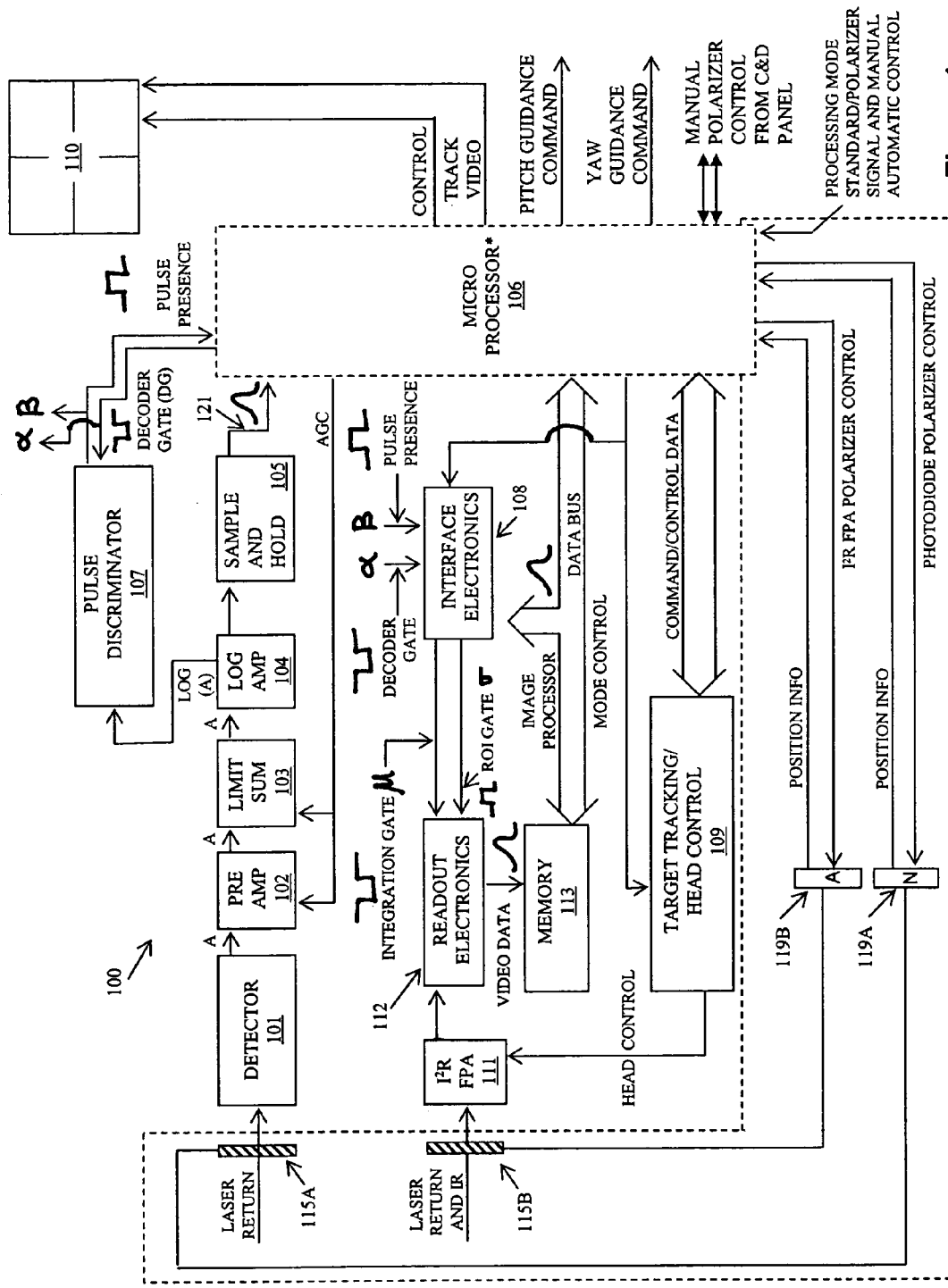
FIG. 1 is a diagram of one embodiment of an improved SALLPL missile seeker that utilizes a staring imaging infrared focal plane array.

FIG. 1 illustrates one embodiment of an improved SALLPL missile seeker 100, wherein the improvement is included within the dashed lines. In an illustrative embodiment, the improvement is achieved by movably disposing polarizers 115A and 115B in front of PIN photodiode detector 101 and staring imaging infrared focal plane array 111, respectively. In one example, polarizer 115A is disposed in, and completely covers, the PIN photodiode detector's field of view. Similarly, polarizer 115B is disposed in, and completely covers, the field of view of the staring imaging infrared focal plane array 111.

Actuator 119A is connected to the polarizer 115A and, and via a control channel, to the microprocessor 106. Actuator 119B is connected to the polarizer 115B and, via a control channel, to the microprocessor 106.

Figure 2:
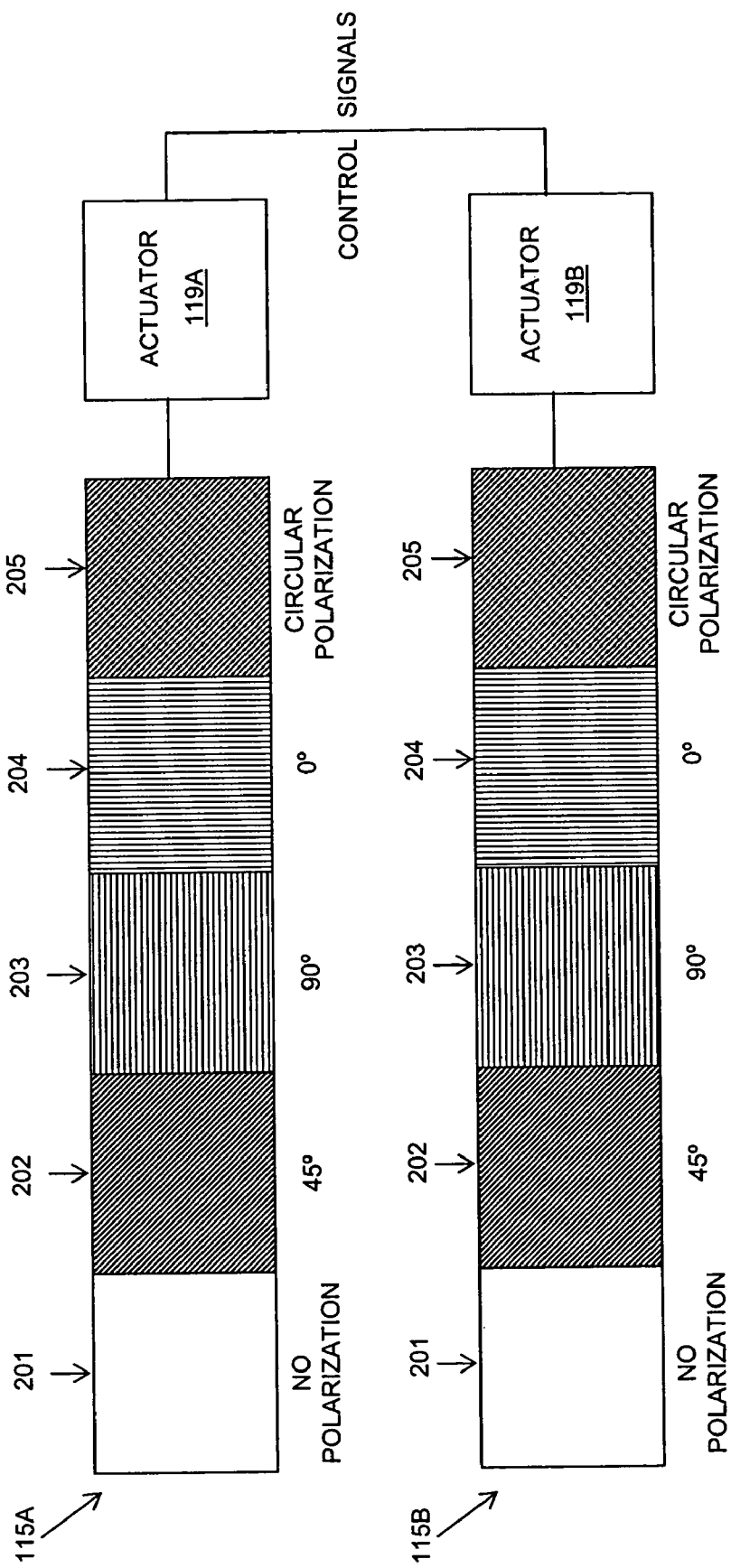
FIG. 2 is a diagram depicting an embodiment of a polarizer-actuator assembly.

FIG. 2 is a schematic depiction of the polarization-actuator assemblies. In the embodiment shown, they are identical in configuration, but not necessarily of the same size. In one embodiment, each polarizer is configured in five segments, one segment having no polarization, each polarized segment allowing the transmission of a different polarization to the PIN photodiode detector 101 and staring imaging infrared focal plane array 111. Thus, in one embodiment, each polarizer 115A and 115B includes one unpolarized segment 201, three linear polarization segments 202–204, and one circular polarization segment 205. The polarization angles of the linear polarization segments 202–204 are 45 degrees, 90 degrees, and 0 degrees, respectively. At any given time, one segment of the polarizer 115A completely covers the field of view of the PIN photodiode detector 101. At any given time, a corresponding segment of the polarizer 115B completely covers the field of view of the staring imaging infrared focal plane array 111. Although each polarizer is illustratively shown to include five discrete segments, the invention is not so limited, as alternate embodiments may include fewer or more segments.

It is understood that the shape of polarizers 115A and 115B is not limited to the rectangular/linear configuration depicted in FIG. 2, but may include circular or other configurations. Similarly, the segments 201–205 need not be positioned adjacent one another in the linear fashion depicted, but may be arranged in other configurations on polarizers 115A and 115B. What matters most is that polarizers 115A and 115B are configured such that selection of any one segment of one polarizer results in an automatic selection of a corresponding segment in the other polarizer. Thus, for example, selection of segment 203 of polarizer 115A would result in the simultaneous selection of segment 203 of polarizer 115B, and vice versa.

Operation of polarizers 115A and 115B in an improved SALLPL missile seeker 100 is now described with reference to FIGS. 1 and 2. In FIG. 1, control signals are routed from the microprocessor 106 to the actuators 119A and 119B. Actuator 119A movably and discretely steps a segment of polarizer 115A so that the segment completely covers the field of view of the PIN photodiode detector. Simultaneously, in response to the remainder of these signals, actuator 119B movably and discretely steps an identical and corresponding segment of polarizer 115B so that the segment completely covers the field of view of the staring imaging infrared focal plane array 111. As used here, the term "identical" means that each of the corresponding segments has the same degree and pattern of polarization.

In use, laser pulses reflected from a target being illuminated by a laser designator (e.g. laser returns), possibly combined with other radiation, pass through the selected segments of polarizers 115A and 115B and are thus polarized at the same polarization angle prior to being detected by the PIN photodiode detector 101 and the staring imaging infrared focal plane array 111. Thereafter, the polarized temporal laser returns of the PIN photodiode detector 101 are acted upon by pre-amp 102, limit sum 103, log amp 104, pulse discriminator 107, and sample and hold 105 and routed to microprocessor 106 to be correlated with the polarized spatial laser returns of the staring imaging infrared focal plane array 111, which reach the microprocessor 106 after being acted upon by readout electronics 112 and interface electronics 108. Video data from readout electronics 112 is stored in memory 113 and routed via an image processor over a data bus to microprocessor 106. After further processing by microprocessor 106, the video data is output to display device 110, which visually depicts a graphical representation of the laser-illuminated target.

The correlation of temporal and spatial laser returns enhances the capability of the SALLPL missile seeker to discriminate between false and real target returns. Such enhancement improves the kill probability of the missile. The use of segmented polarizers 115A and 115B further enhances the SALLPL missile seeker 100's acquisition and tracking ability, based on the fact that emissive and scattered energy in the laser and mid-infrared bands from man-made objects tends to be more highly polarized than emissive or scattered energy from natural objects. Use of corresponding individual segments of polarizers 115A and 115B attenuates and more clearly defines the temporal and spatial laser returns reflected from a target. Discretely stepping segmented polarizers 115A and 115B through a range of polarizations permits determination of the linear polarization of the reflected temporal and spatial returns, which provides another likelihood that the detected returns are from a man-made object and not from clutter.

Referring again to FIG. 1, the actuators 119A and 119B for the polarizers 115A and 115B are driven by the same signal that opens the decoder gate a. In the embodiment illustratively depicted, there are potentially four different polarization possibilities. Although a variety of processing techniques may be used, only linear polarization processing will be described here.

In response to incoming laser return pulses, each actuator 119A and 119B steps segments of its respective polarizer 115A and 115B over the corresponding PIN Photodiode detector 101 and staring imaging infrared focal plane array 11 in four discrete steps in synchronism with the other actuator so that the corresponding identical segment is positioned (either the one unpolarized segment 201, or one of the three linear polarization segments 202–204, or the one circular polarization segment 205) over the PIN photodiode detector 101 and staring imaging infrared focal plane array 111. Note that the stepping sequence for the staring imaging infrared focal plane array 111 must take into account the focal plane array's integration time.

For the staring imaging infrared focal plane array 111, the four discrete steps of the movement of the polarizer 115B can be read out in four frames, each with a different polarization, to allow the focal plane array 111 to receive data sequentially. From this data, the degree of linear polarization can be computed for each pixel in the focal plane array 111, and used to provide a high resolution map of the polarization in the detection field of view. Using polarizer 115A, similar sequential frames of differing polarization may be read out for the PIN photodiode detector 101 to further enhance its discrimination capability of objects within its detection field of view.

Microprocessor 106 receives a pulse presence signal α, which it processes to calculate and store information on each detected laser return pulse. The photodiode return 121 is processed in either standard mode or polarization mode. Standard mode processing is used for non-polarized photodiode returns. Polarization mode processing is used for polarized photodiode returns 121. Types of information processed and stored by microprocessor 106 include: pulse amplitude, pulse time, pulse width, pulse rise/fall time, and pulse history. Additionally, microprocessor 106 calculates the Stokes Vectors used for discriminating the polarized laser returns detected by the SALLPL missile seeker 100. Incorporating the Stokes Vector calculations helps the SALLPL missile seeker 100 acquire and track the true target.

Illustratively, pulse processing of a polarized return accomplished by identifying a polarization input signal (flag) which tells the microprocessor 106 when data is received while the polarizers 115A and 115B are active. More specifically, the polarization input signal informs the microprocessor 106 as to which particular segment(s) of the polarizers are active. A polarization subroutine then automatically controls the discrete stepping of both polarizers 115A and 115B. Alternatively, the discrete stepping of both polarizers can be accomplished manually using control signals generated by a control display panel (not shown), which receives data input by a user.

Data from polarization returns received while polarizers 115A and 115B are active is stored in memory 113. These polarization returns are accessed by the microprocessor 106 through the data bus for the focal plane array, and from the sample and hold 105 for the PIN photodiode detector 101. Once the polarized returns are retrieved, the microprocessor 106 performs signal-processing algorithm functions used to correlate the polarized temporal and spatial laser returns detected by SALLPL missile seeker 100. The particular signal-processing algorithm varies according to which polarization subroutine is activated by the polarization input signal. Because it is more likely that a man-made target will generate a polarized return, using polarizers 115A and 115B to increase the ability of PIN photodiode 101 and staring imaging infrared focal plane array 111 to identify the polarized return will improve the SALLPL missile seeker 100's temporal-spatial correlation, thereby enhancing the seeker's ability to discriminate a man-made target from clutter.

Various types of staring imaging infrared focal plane arrays may be used. Illustrative examples include an Amber Indium Antimonide (InSB) or Boeing Mercury Cadmium Telluride (MCT) focal plane array. In one embodiment, an Amber InSb array having a frame time of 33 milliseconds (frame rate of 30 Hz) permits variable integration times and accessibility to various regions of interest of the array within a given frame.

Similarly, various types of PIN photodiode detectors may be used. Illustratively, a single PIN detector is used, which requires only one signal processing channel as opposed to four. The single processing channel provides better sensitivity over a four-channel PIN detector because sensitivity is related to detector area and the laser spot is focused on a single channel rather than diffused over a four-channel quadrant. That said, a four-channel PIN detector may be used when classical four-quadrant detector-generated missile guidance commands are desired or necessary.

Referring again to FIG. 1, a more detailed explanation of the operation of a conventional SALLPL missile seeker 100 is provided. Temporal laser pulse returns detected by the PIN photodiode 101 are subsequently processed by preamplifier 102, limit sum 103, and log amplifier 104, and input to pulse discriminator 107. The pulse discriminator 107, in conjunction with the sample and hold 105, establishes a dynamic pulse detection threshold based on the amplitude of the first temporally detected pulse and generates a pulse presence signal (pulse normalizer pulse), indicated by β in FIG. 1, which is input to microprocessor 106. The pulse detection threshold decays at a given constant rate over time, and laser returns detected by PIN photodiode detector 101 which break this decaying threshold are identified as possibly indicating detection of a man-made target. In this manner, the last pulse to break the threshold is deemed indicative of the true target and the one to be tracked.

In response to the β pulse presence signal, the microprocessor 106 generates a decoder gate, indicated by α. This decoder gate information is input to the discriminator 107 to capture laser pulses at pre-set times. The decoder gate α is also input to the interface electronics 108 (along with pulse presence signals representative of laser pulse returns occurring within the decoder gate). Interface electronics 108 uses the decoder gate α information to generate an integration gate, indicated by μ, and a region of interest (ROI) gate, indicated by σ. The integration gate μ is then used to command the staring imaging infrared focal plane array 111 to collect imagery. The ROI gate σ is used to correlate the temporal and spatial laser returns received by the SALLPL missile seeker 100.

Upon receipt of the integration gate μ from the interface electronics 108, readout electronics 112 activates the staring imaging infrared focal plane array 111 to scan the array's field of view and collect spatial laser return data. In this manner, all laser pulses reflected by objects within the array's field of view during the duration of the integration gate μ are detected.

In one embodiment, the ROI gate σ can be used to vary the duration of the integration gate μ to stop the staring imaging infrared focal plane array 111 from scanning the array's field of view. More particularly, after the staring imaging infrared focal plane array 111 scans its field of view for the duration of the integration gate μ and detects all reflected laser pulses occurring therein, microprocessor 106 may determine where on the focal plane array 111 these spatial laser pulse returns occur and create additional ROI gates to be evaluated on successive decoder gates and integration gates. After the first decoder gate α, the integration gate μ is controlled by the ROI gate σ to correlate the spatial and temporal laser pulse returns.

Figure 3:
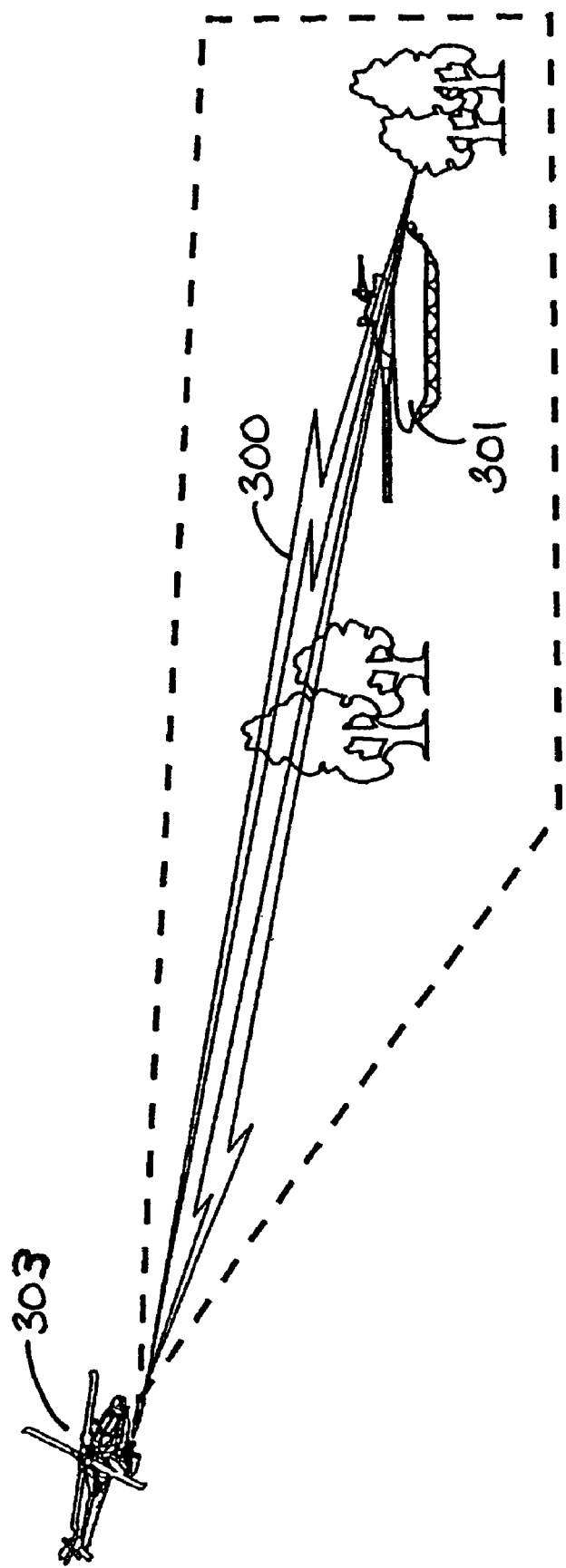
FIG. 3 is a depiction of a typical setting in which the improved SALLPL missile seeker can be used.

FIG. 3 depicts a scenario in which an embodiment of the improved SALLPL missile seeker 100 may be used. The scenario illustrates airborne laser designation 300 of a potential target 301 from an aircraft 303. However, ground-based laser designation works just as well.

In one embodiment, the elements, functions, signals and steps described above are the means for correlating incoming temporal laser returns detected by the PIN photodiode detector with incoming spatial returns received by the staring imaging infrared focal plane array detector, and means for identifying, on the staring imaging infrared focal plane, the spatial laser return indicative of a laser-illuminated target.

In practicing the invention herein described and claimed, it is understood that a variety of actuators and infrared polarizers may be used, and that such elements may be custom-manufactured by manufacturers such as MEMS Optical Company, 205 Import Circle, Huntsville, Ala. 35806; Meadowlark Optics, P.O. Box 1000, Frederick, Colo. 80530; and Corning, One Riverfront Plaza, Corning, N.Y. 14831. This list of manufacturers is by no means exhaustive, but is offered for illustrative purposes only.

What is claimed is:

1. An improvement in a semi-active laser last pulse logic missile seeker, the seeker having a single PIN photodiode detector, a staring imaging infrared focal plane array detector, means for correlating incoming temporal laser returns detected by the PIN photodiode detector with incoming spatial returns received by the staring imaging infrared focal plane array detector, and means for identifying, on the staring imaging infrared focal plane, the spatial laser return indicative of a laser-illuminated target, wherein the improvement comprises:

a first polarizer disposed in a field of view of the PIN photodiode detector, the first polarizer having a first plurality of segments, each segment sized to completely cover the field of view of the PIN photodiode detector, wherein each segment allows transmission of a different polarization than other segments within the first plurality of segments;

a second polarizer disposed in a detection field of view of the staring imaging infrared focal plane array, the second polarizer having a second plurality of segments corresponding to the plurality of segments of the first polarizer, each segment of the second plurality of segments sized to completely cover the field of view of the staring imaging infrared focal plane array, wherein each segment allows transmission of a different polarization than other segments within the second plurality of segments; and first and second actuators connected to the first and second polarizers to synchronously and simultaneously step corresponding segments of the first and second plurality of segments in a plurality of discrete steps within the corresponding fields of view in response to the incoming temporal and spatial laser returns.

2. The improvement of claim 1, wherein a segment of the first plurality of segments is identical in degree and pattern of polarization to a segment of the second plurality of segments.

3. The improvement of claim 2, wherein each of the first and second pluralities of segments includes one non-polarized segment.

4. The improvement of claim 2, wherein the number of segments within the first plurality of segments is five.

5. The improvement of claim 4, wherein the number of steps within the plurality of discrete steps is four.

6. The improvement of claim 2, wherein the first plurality of segments includes three linear polarization segments, each linear polarization segment having a corresponding polarization angle.

7. The improvement of claim 6, wherein the polarization angle of one of the linear polarization segments is 45 degrees.

8. The improvement of claim 6, wherein the polarization angle of one of the linear polarization segments is 90 degrees.

9. The improvement of claim 6, wherein the polarization angle of one of the linear polarization segments is 0 degrees.

10. The improvement of claim 2, wherein the first plurality of segments includes one circular polarization segment.

11. A method of distinguishing a laser-illuminated target from background radiation using a semi-active laser last pulse logic missile seeker, the seeker having a single PIN photodiode detector or four quadrant detectors, a staring imaging infrared focal plane array detector, means for correlating incoming temporal laser returns detected by the PIN photodiode detector with incoming spatial returns received by the staring imaging infrared focal plane array detector, and means for identifying, on the staring imaging infrared focal plane, the spatial laser return indicative of a laser-illuminated target, the method comprising:

disposing a first polarizer in the field of view of the PIN photodiode detector, the first polarizer having a first plurality of segments, each segment sized to completely cover the field of view of the PIN photodiode detector, wherein each segment allows transmission of a different polarization than other segments within the first plurality of segments;

disposing a second polarizer disposed in the detection field of view of the staring imaging infrared focal plane array, the second polarizer having a second plurality of segments corresponding to the plurality of segments of the first polarizer, each segment of the second plurality of segments sized to completely cover the field of view of the staring imaging infrared focal plane array, wherein each segment allows transmission of a different polarization than other segments within the second plurality of segments; and synchronously and simultaneously stepping corresponding segments of the first and second plurality of segments in a plurality of discrete steps within the corresponding fields of view in response to the incoming temporal and spatial laser returns.

12. The method of claim 11, further comprising:
correlating incoming polarized temporal laser returns detected by the PIN photodiode detector with incoming polarized spatial returns received by the staring imaging infrared focal plane array detector.

13. The method of claim 12, further comprising:
identifying, on the staring imaging infrared focal plane array, the polarized spatial laser return indicative of the laser-illuminated target.

14. The method of claim 11, wherein the segment stepped to completely cover the field of view of the PIN photodiode detector is identical to the segment synchronously and simultaneously stepped to completely cover the field of view of the staring imaging infrared focal plane array.

15. The method of claim 14, wherein the first plurality of segments includes three linear polarization segments, each linear polarization segment having a corresponding polarization angle.

16. The method of claim 15, wherein the polarization angle of one of the linear polarization segments is 45 degrees.

17. The method of claim 15, wherein the polarization angle of one of the linear polarization segments is 90 degrees.

18. The method of claim 15, wherein the polarization angle of one of the linear polarization segments is 0 degrees.

19. The method of claim 11, wherein the first plurality of segments includes one non-polarized segment.

20. The method of claim 11, wherein the number of segments in the first plurality of segments is five.

21. The method of claim 11, wherein the number of steps in the plurality of discrete steps is four.

22. The method of claim 11, wherein the first plurality of segments includes one circular polarization segment.

* * * * *